(12) United States Patent
Li et al.

(10) Patent No.: US 11,163,470 B2
(45) Date of Patent: Nov. 2, 2021

(54) METHOD, ELECTRONIC DEVICE AND COMPUTER PROGRAM PRODUCT FOR MANAGING REDUNDANT ARRAYS OF INDEPENDENT DISKS

(71) Applicant: EMC IP Holding Company LLC, Hopkinton, MA (US)

(72) Inventors: Xiongcheng Li, Beijing (CN); Xinlei Xu, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/654,702

(22) Filed: Oct. 16, 2019

(65) Prior Publication Data
US 2020/0133494 A1   Apr. 30, 2020

(30) Foreign Application Priority Data

Oct. 31, 2018   (CN) .......................... 201811288170.9

(51) Int. Cl.
*G06F 3/06*   (2006.01)
*G06F 11/10*  (2006.01)

(52) U.S. Cl.
CPC ............ *G06F 3/064* (2013.01); *G06F 3/0616* (2013.01); *G06F 3/0619* (2013.01); *G06F 3/0631* (2013.01); *G06F 3/0653* (2013.01); *G06F 3/0689* (2013.01); *G06F 11/1092* (2013.01)

(58) Field of Classification Search
CPC ...... G06F 3/064; G06F 3/0616; G06F 3/0614; G06F 3/0619; G06F 3/0631; G06F 3/0653; G06F 3/0689; G06F 3/0629; G06F 3/0644; G06F 3/0688; G06F 11/1092; G06F 11/1076
See application file for complete search history.

(56) References Cited

U.S. PATENT DOCUMENTS

| | | |
|---|---|---|
| 9,703,664 B1 | 7/2017 | Malak et al. |
| 9,940,033 B1 | 4/2018 | Malak et al. |
| 9,946,471 B1 * | 4/2018 | More ..................... G06F 3/0631 |
| 9,965,218 B1 | 5/2018 | Owen et al. |
| 10,078,569 B1 | 9/2018 | Malak et al. |
| 10,209,904 B2 | 2/2019 | Mark et al. |
| 10,254,970 B1 | 4/2019 | Owen et al. |
| 10,261,717 B1 | 4/2019 | Owen et al. |
| 10,282,107 B1 | 5/2019 | Owen et al. |

(Continued)

FOREIGN PATENT DOCUMENTS

WO   WO-2018004368 A1 * 1/2018 ........... G11C 16/349

*Primary Examiner* — Michael Krofcheck
(74) *Attorney, Agent, or Firm* — BainwoodHuang (57) ABSTRACT

Techniques manage a redundant array of independent disks. Such techniques involve: obtaining information on a wear level associated with each of a plurality of disks; selecting, based on the information on the wear level, a group of disks from the plurality of disks, a difference between the wear levels of any two of the group of disks being below a predetermined threshold; and creating a RAID with extents from the selected group of disks. Such techniques can sufficiently utilize the wear level to balance the data storage distribution among redundant arrays of independent disks, thereby enabling efficient management of redundant arrays of independent disks.

15 Claims, 3 Drawing Sheets

(56) References Cited

U.S. PATENT DOCUMENTS

| | | | |
|---|---|---|---|
| 2004/0162940 A1* | 8/2004 | Yagisawa | G06F 3/0689 |
| | | | 711/114 |
| 2016/0292025 A1* | 10/2016 | Gupta | G06F 11/008 |
| 2017/0131947 A1* | 5/2017 | Hoang | G06F 11/00 |
| 2018/0284997 A1* | 10/2018 | Dalmatov | G11C 16/349 |
| 2019/0220212 A1* | 7/2019 | Xu | G06F 3/0616 |

\* cited by examiner

METHOD, ELECTRONIC DEVICE AND COMPUTER PROGRAM PRODUCT FOR MANAGING REDUNDANT ARRAYS OF INDEPENDENT DISKS

CROSS-REFERENCE TO RELATED APPLICATION

This application claims priority to Chinese Patent Application No. CN201811288170.9, on file at the China National Intellectual Property Administration (CNIPA), having a filing date of Oct. 31, 2018, and having "METHOD, ELECTRONIC DEVICE AND COMPUTER PROGRAM PRODUCT FOR MANAGING REDUNDANT ARRAYS OF INDEPENDENT DISKS" as a title, the contents and teachings of which are herein incorporated by reference in their entirety.

FIELD

Embodiments of the present disclosure generally relate to the field of data storage, and specifically to a method, an electronic device, and a computer program product for managing a redundant array of independent disks.

BACKGROUND

A storage system generally has a plurality of disks which may be organized in a disk array. These disks may be used by a user to write data. For example, a Redundant Array of Independent Disks (RAID) is a data storage virtualization technology that organizes a plurality of disks into a single logical unit for the purpose of data redundancy backup and/or performance improvement. As more and more data is written, some disks may be overloaded. It is challenging how to balance data storage among RAIDs to avoid such a overload.

SUMMARY

Embodiments of the present disclosure provide a method, an electronic device, and a computer program product for managing redundant arrays of independent disks (RAID), which intends to at least partly address the above and/or other potential problems in the field of data storage.

In a first aspect, embodiment of the present disclosure provides a method of managing a redundant array of independent disks (RAID). The method includes: obtaining information on a wear level associated with each of a plurality of disks; selecting based on the information on the wear level, a group of disks from the plurality of disks, a difference between wear levels of any two of the group of disks being below a predetermined threshold; and creating a RAID with extents from the selected group of disks.

In some embodiments, the RAID includes a plurality of physical large blocks (PLBs), each PLB including a block in extents of each of the group of disks, the method further including: in response to receiving a request to write target data to the RAID, determining, from the plurality of PLBs of the RAID, a first number of used PLBs having data stored therein; determining, based on an average value of wear levels of the group of disks and from the plurality of PLBs of the RAID, a second number of PLBs expected to store data; and in response to the first number being below the second number, determining a third number of free PLBs available for storing the target data.

In some embodiments, the method further includes determining the third number of free PLBs from the plurality of PLBs; and storing the target data in the free PLBs.

In some embodiments, determining a second number of PLBs expected to store data among the plurality of PLBs of the RAID includes: determining, based on the average value of the wear levels of the group of disks, a first the wear level of the RAID; determining, based on the first wear level of the RAID, a fourth number of unreserved PLBs from the plurality of PLBs of the RAID; determining, based on a second wear level of another RAID associated with the RAID, a fifth the number of used PLBs and a sixth number of unreserved PLBs of the other RAID; and determining based on the first number of used PLBs and the fourth number of unreserved PLBs of the RAID as well as the fifth number of used PLBs and the sixth number of unreserved PLBs of the other RAID, the second number of PLBs from the plurality of PLBs of the RAID.

In some embodiments, the method further includes: in response to the first number exceeding the second number, determining whether there is another RAID available for storing the target data; and in response to absence of the other RAID, adding a new disk to the plurality of disks to update the RAID.

In some embodiments, obtaining information on the wear level associated with each of the plurality of disks includes: obtaining used time of a disk, the used time indicating a duration that the disk has been used to store data; obtaining a rated lifetime of the disk, the rated lifetime indicating the maximum time that the disk can be used to store data; and obtaining based on the used time and the rated lifetime, the information on the wear level associated with the disk.

In a second aspect, an embodiment of the present disclosure provides an electronic device for managing a RAID. The electronic device includes: at least one processing unit; at least one memory coupled to the at least one processing unit and storing instructions executed by the at least one processing unit, the instructions, when executed by the at least one processing unit, causing the device to perform acts, the acts including: obtaining information on a wear level associated with each of a plurality of disks; selecting based on the information on the wear level, a group of disks from the plurality of disks, a difference between the wear levels of any two of the group of disks being below a predetermined threshold; and creating a RAID with extents from the selected group of disks.

In a third aspect, embodiment of the present disclosure provides a computer program product. The computer program product is tangibly stored in a non-transitory computer storage medium and includes machine-executable instructions. The machine-executable instructions, when executed by a device, cause the device to perform any of the steps of the method described in accordance with the first aspect of the present disclosure.

This Summary is provided to introduce a selection of concepts in a simplified form that are further described hereinafter in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference signs refer to the same elements in example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described hereinafter in more detail with reference to the accompanying drawings. It is to be understood that although preferred embodiments of the present disclosure are illustrated in the drawings, the present disclosure described herein can be implemented in various manners and should not be construed as being limited to implementations illustrated herein. Rather, these implementations are provided to make the present disclosure described herein more thoroughly and completely and fully convey the scope of the present disclosure described herein to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least partially on." The term "an example implementation" and "an example implementation" are to be read as "at least one example implementation." The term "another implementation" is to be read as "at least one other implementation." Terms "a first", "a second" and others may indicate the different or the same objects. The following text may also contain other explicit or implicit definitions.

In a traditional manner of data storage, RAID is divided into portions with finer granularity, namely Physical Large Block (PLB). When the user writes data, a processor selects a free PLB from the RAID and writes the user data into the PLB. The PLB is selected sequentially in the traditional manner of data storage. When all the PLBs in the RAID are used up, the processor selects next RAID and likewise selects the free PLB from this RAID for the user to write data. Such a method does not consider the wear level of the disk. In addition, such a method does not balance the user data in RAID. Therefore, some disks may be overloaded and might even be damaged.

With respect to the above and other potential problems, embodiments of the present disclosure propose a method of managing the RAID. The method according to embodiments of the present disclosure take into account the wear level of the disks when writing data, thereby avoiding the case that some disks are greatly worn out and then overloaded or damaged, thereby achieving efficient management of the redundant array of independent disks. An environment in which a method according to an embodiment of the present disclosure may be implemented is described in more detail hereinafter with reference to FIGS. 1 and 2.

Figure 1:
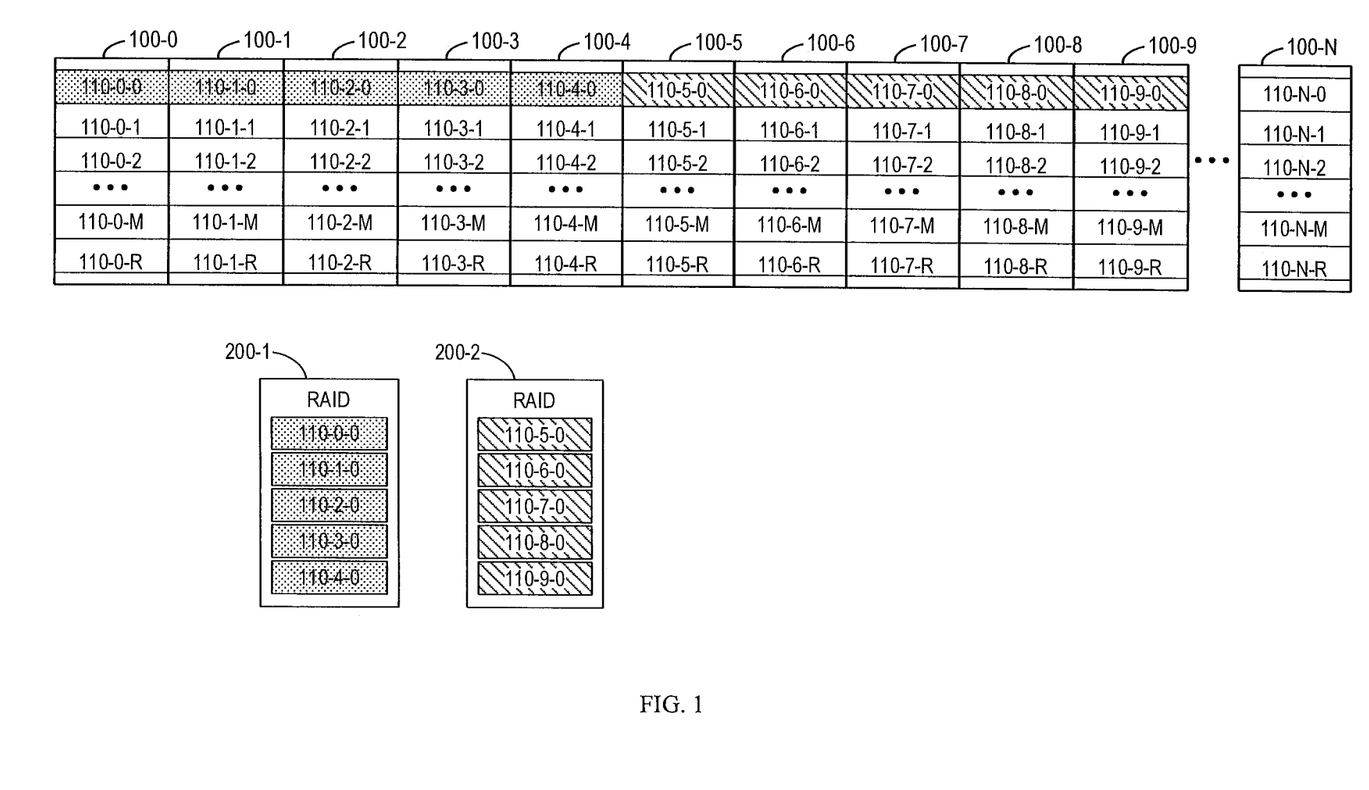
FIG. 1 illustrates an illustrative method of creating a RAID using a method according to an embodiment of the present disclosure.

FIG. 1 illustrates an illustrative method of creating a RAID 200 using a method according to an embodiment of the present disclosure. Referring to FIG. 1, a plurality of disks 100-0, 100-1, 100-2, . . . , 100-N (collectively referred to as "disk 100" or "storage disk 100", where N is a positive integer) are shown. A "disk" as used herein may refer to any currently known or future-developed non-volatile storage medium, such as a magnetic disk, optical disk, or solid state disk (SSD). In the description herein, a magnetic disk will be taken as an example of the disk. However, it should be appreciated that this is for the purpose of description only, and is not intended to limit the scope of the present disclosure.

Each disk 100 may be divided into a plurality of extents 110. For example, the disk 100-0 may include a plurality of extents 110-0-0, 110-0-1, . . . , 110-0-M, where M is a positive integer. Similarly, the disk 100-1 may include a plurality of extents 110-1-0, 110-1-1, . . . , 110-1-M, and the like. These extents are collectively referred to as extent 110. In the numbering of the extent, the first digit after the number "110" indicates which disk the extent belongs to, and the second digit after the number "110" indicates which section on the disk the extent is. These extents may have the same size. As shown in FIG. 1, the disk 100-0 may also include a reserved extent 110-0-R which may function to retain data.

It is possible to constitute a RAID by using at least a portion of the plurality of extents, and usually combines multiple physical storage units into a logical storage unit for the purpose of data redundancy backup and/or performance improvement. Depending on the required redundancy and performance level, it may have different types, such as RAID 0, RAID 1, . . . , RAID 5, and the like.

The RAID may include a data extent for storing user data and a proof extent for storing proof information. Take RAID 5 with a 4D+1P layout for example, wherein each RAID may include 4 data extents (i.e. "4D") and 1 proof extent (i.e., "1P"). In the following description, the RAID 5 with 4D+1P will be taken as an example of RAID 200. However, it should be understood that this is for the purpose of description only and does not imply any limitation of the scope of the disclosure. Embodiments of the present disclosure may be applied to other types of RAID having other layouts.

According to the type of the RAID, extents 110 may be selected from each of the different disks 100 to form a RAID. Taking RAID 5 for example, it is necessary to select one extent from each of the five disks 100 (for example, disk 100-0, 100-1, 100-2, 100-3 and 100-4) respectively, to form a RAID 200-1. For example, in the embodiment illustrated in FIG. 1, the extent 110-0-0 in the disk 100-0, the extent 110-1-0 in the disk 100-1, the extent 110-2-0 in the disk 100-2, the extent 110-3-0 in the disk 100-3 and the extent 110-4-0 in the disk 100-4 are selected to form a RAID 200-1. It is to be understood that this is merely by way of example, and it is possible to select from other five disks in the disks 100 to form the RAID 200.

Each disk 100 has a certain wear level which represents the degree of wear of the disk during use. The wear level plays an important role in the data storage of the storage disk. Multiple grades of wear levels may be defined. For different wear levels, some space may be reserved in the RAID. These spaces are not used to store user data in consideration of the wear level, and the remaining space in the RAID may be used to store the user data.

Figure 3:
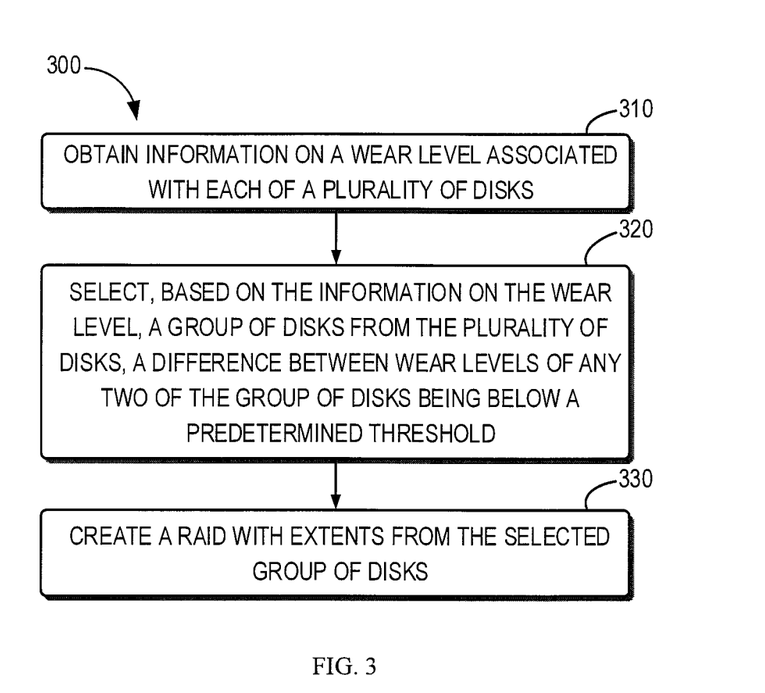
FIG. 3 illustrates a flow chart of a method for managing a RAID according to an embodiment of the present disclosure.

Embodiments according to the present disclosure are described hereinafter with reference to FIG. 3.

At block 310, information on the wear level associated with each disk 100-0, 100-1, . . . , 100-N of the plurality of disks 100 is obtained. These information on the wear level may be stored on the firmware of respective disks 100-0, 100-1, . . . , 100-N to reflect the wear condition of the respective disks 100-0, 100-1, . . . , 100-N.

At block 320, referring to FIG. 1, a group of disks 100-0, 100-1, 100-2, 100-3, 100-4 are selected from a plurality of disks 100 based on the information on the wear level. The difference of the wear levels between any two of the group of disks 100-0, 100-1, 100-2, 100-3, 100-4 is below a predetermined threshold. The predetermined threshold may be a percentage and may be adjusted according to different environments and different user demands.

In alternative embodiments, for example, the predetermined threshold may be set to 5%, and in such cases, several disks with wear levels such as 11%, 11%, 13%, 14%, and 15%, respectively, may be selected as a group of disks. Similarly, for example, several disks with wear levels 33%, 34%, 34%, 36%, and 37% respectively may be selected as a group of disks. Of course, these numbers are merely for the purpose of illustration. For convenience of representation, a group of disks 100-0, 100-1, 100-2, 100-3, 100-4 selected based on the wear level in FIG. 1 is represented as a group of disks whose numbers are neighboring. Of course, the group of disks may be a group of disks whose numberings are not neighboring as long as the difference in wear levels between any two of the disks is below the predetermined threshold. As shown in FIG. 1, another group of disks 100-5, 100-6, 100-7, 100-8, 100-9 with similar wear levels may be selected in the same manner. By means of block 320, the percentage of wear levels of each of the selected group of disks is within a certain range. That is, the degree of wear in this group of disks is similar.

At block 330, RAID 200-1 is created using the extents in the selected group of disks 100-0, 100-1, 100-2, 100-3, and 100-4. Referring to FIG. 1, the extent 110-0-0 in the disk 100-0, the extent 110-1-0 in the disk 100-1, the extent 110-2-0 in the disk 100-2, the extent 110-3-0 in the disk 100-3 and the extent 110-4-0 in the disk 100-4 are selected to create the RAID 200-1. Similarly, the extent 110-5-0 in the disk 100-5, the extent 110-6-0 in the disk 100-6, the extent 110-7-0 in the disk 100-7, the extent 110-8-0 in the disk 100-8 and the extent 110-9-0 in the disk 100-9 are selected to create the RAID 200-2. Multiple RAID 200-1, RAID 200-2, . . . , RAID 200-P (collectively referred to as "RAID 200", where P is a positive integer) may be created in this way.

According to embodiment of the present disclosure, disks with close wear levels are selected to create a RAID. This can avoid creating the RAID from disks with wear degree that are greatly different from each other. In this way, the overall wear degree of disks in the disk array may be taken into account during the creation of the RAID, thus preventing some disks from being damaged in the first place due to an excessive wear degree during use.

Figure 2:
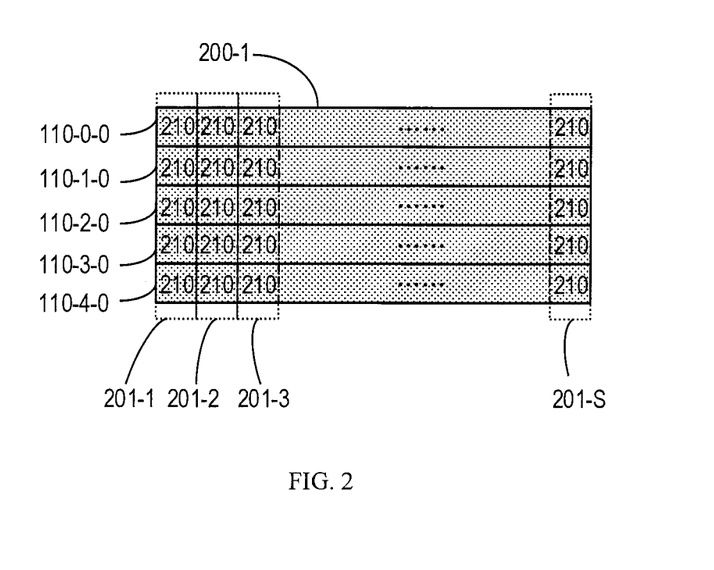
FIG. 2 illustrates a schematic diagram of a RAID including a plurality of PLBs according to an embodiment of the present disclosure.

In some embodiments, as shown in FIG. 2, each of the extents 110-0-0, 110-1-0, 110-2-0, 110-3-0, 110-4-0 may include a plurality of blocks 210. A block 210 is selected from each of the extents 110-0-0, 110-1-0, 110-2-0, 110-3-0, 110-4-0 to form a PLB 201-1. When user data is being written, the PLB 201-1 may be regarded as a minimal unit for storing user data. The PLB 201-1 may have a size of about 2 M. A plurality of other PLBs 201-2, 201-3, . . . , 201-S may be formed in a similar manner. As shown in FIG. 2, the RAID 200-1 may include a plurality of PLBs 201-1, 201-2, and the like. PLB 201-1 will be taken as an example of the PLB below.

When it is necessary to write data supplied by the user, the number of used PLBs in which data has been stored in the RAID 200-1 may be determined in response to receiving a request to write the target data to the RAID 200-1. It is possible to determine the number of PLBs in the plurality of PLBs that are expected to store data based on the wear levels of a group of disks 100-0, 100-1, 100-2, 100-3 and 100-4 corresponding to the extents 110-0-0, 110-1-0, 110-2-0, 110-3-0 and 110-4-0. In some embodiments, an average value of the wear levels of all disks in the group of disks 100-0, 100-1, 100-2, 100-3, and 100-4 may be selected as a measurement of the wear level of the group of disks. As described above, since the selection of the group of disks 100-0, 100-1, 100-2, 100-3 and 100-4 is implemented based on a standard that the wear level is relatively close, the measurements of the wear levels of the group of disks 100-0, 100-1, 100-2, 100-3, and 100-4 obtained according to the average value of the wear level of each disk are also close to the actual wear level of each disk. As such, an average value of the wear levels of all disks may better reflect the wear degree of each disk.

In some embodiments, four fields may be maintained in each RAID 200, i.e., the number of reserved PLBs, the number of used PLBs, the number of free PLBs, and the number of PLBs that are expected to store data. Among the four fields, the number of reserved PLBs represents the number of PLBs used to provide the reserved data as described above; the number of used PLBs represents the number of PLBs having user data stored thereon as described above; the number of free PLBs represents the number of PLBs that is available for being allocated to store user data; and the number of PLBs that are expected to store data represents the number of PLBs expected to store data among a plurality of PLBs determined according to the wear level.

If it is judged that the number of used PLBs in which data has been stored is less than the number of PLBs that are expected to store data in a plurality of PLBs, it means that there is still space in the RAID 200 to store data written by the user. In this case, the RAID 200 is placed in an allocating ring which is used to store a RAID that satisfies the above judgment condition. That is, the RAIDs in the allocating ring have free PLBs to store data. Further, the number of free PLBs available for storing the target data is determined using the difference between the number of PLBs expected to store data among the plurality of PLBs and the number of used PLBs in which the data has been stored. It is to be understood that in the case where the number of used PLBs is below the number of PLBs expected to store data in a plurality of PLBs, the number of available PLBs available for storing the target data is a positive integer. When it is necessary to store data written by the user, the PLB is selected from the allocating ring to write the data. After the data writing is completed, the number of available PLBs and the number of used PLBs may be updated.

If it is judged that the number of used PLBs in which data has been stored exceeds the number of PLBs that are expected to store data in a plurality of PLBs, it means that there is no space in the RAID 200 to store data written by the user. In this case, the RAID is placed in an overrun ring instead, and the overrun ring is used to store a RAID that satisfies this judgment condition. That is to say, all the RAIDs in the overrun ring do not have free PLBs to store the data to be written.

In this way, the RAID 200-1 may be alternatively placed into the allocating ring or overrun ring according to the wear level thereof and the number of stored data therein, so as to judge whether to write data to the RAID 200-1 while data is being written. If the wear levels of the plurality of disks 100-0, 100-1, 100-2, 100-3, and 100-4 associated with the RAID 200-1 are high, data would not be written to the RAID 200-1. If the wear levels of the plurality of disks 100-0, 100-1, 100-2, 100-3, and 100-4 associated with the RAID 200-1 are low, the data would be written to the RAID 200-1. With the allocation and release of the PLB, the RAID 200-1 may be switched between the allocating ring and the overrun ring. In this way, it may be possible to prevent data from being continuously written to the disk already having a large degree of wear, thus effectively preventing the overload of some disks in the disk array.

In some embodiments, the PLB expected to store data is determined from the plurality of PLBs 201-1, 201-2, ..., 201-S based on the determined number of free PLBs available for storing the target data, and the target data is stored in the determined PLBs.

In some embodiments, Table 1 may be utilized to establish a correspondence relationship between the wear levels and a proportion of the number of reserved PLBs to the total number of PLBs in the RAID. As shown in Table 1, six grades of wear levels may be defined. Of course, this is merely by way of example, and more or less grades of wear levels may be defined according to different requirements of precision, that is, according to actual needs, division with finer or coarser granularity may be performed. The correspondence relationship between the wear level $W_i$, and proportion $O_i$, of the number of reserved PLBs to the total number of PLBs in the RAID is only by way of example and shown in Table 1.

TABLE 1

| Wear level $W_i$ (%) | Proportion $O_i$ of the number of reserved PLBs to the total number of PLBs in the RAID (%) |
|---|---|
| >50 | 50 |
| 50 | 40 |
| 40 | 30 |
| 30 | 20 |
| 20 | 10 |
| 10 | 0 |

The wear level may be expressed with a percentage. The greater the percentage of the wear level of the disk is, the greater the wear degree of the disk is, i.e., this means that the disk is more inclined to the end of the life of the disk. On the contrary, the smaller the percentage of wear level of the disk is, the smaller the wear degree of the disk is, i.e., this means that the disk is "newer". As shown in Table 1, the higher the wear level $W_i$ is, the higher the proportion $O_i$, of the number of reserved PLBs to the total number of PLBs in the RAID is. The wear level $W_i$, may be stored as a field in the disk.

In some embodiments, the number $P_i$ of PLBs expected to store data among the plurality of PLBs may be calculated by the following Equation (1):

$$P_i = \frac{(1-O_i)*C_i}{\sum_{i=1}^{n}(1-O_i)*C_i} * T \qquad (1)$$

where $O_i$ represents the proportion of the reserved PLB in the it RAID to the total number of PLBs, and the proportion $O_i$ may be determined from above Table 1 according to the wear level $W_i$; $C_i$ represents the total number of PLBs of the $i^{th}$ RAID; $(1-O_i)*C_i$ represents the number of unreserved PLBs of the $i^{th}$ RAID in the disk array. T represents the sum of the number of PLBs in a plurality of RAIDs in the disk array in which data has been stored.

In some embodiments, the wear level $W_i$, associated with RAID 200-1 is determined based on an average value of the wear levels of the group of disks 100-0, 100-1, 100-2, 100-3, and 100-4. The $O_i$ corresponding to the wear level may be determined according to Table 1. The number of unreserved PLBs, namely $(1-O_i)*C_i$ in the plurality of PLBs 201-1, 201-2, ..., 201-S of RAID 200-1 may be then obtained according to the total number $C_i$ of PLBs in the RAID and the determined $O_i$.

Subsequently, the number of unreserved PLBs of other RAIDs in the disk array is similarly calculated, and summated to obtain $\Sigma_{i=1}^{n}(1-O_i)*C_i$. The number of used PLBs of each RAID in the disk array is determined, and Tis obtained by summation. The number of PLBs expected to store data among the plurality of PLBs 201-1, 201-2, ..., 201-S in the RAID 200-1 is calculated based on the above Equation (1).

In this way, by using $O_i$, when determining the number of PLBs expected to store data among a plurality of PLBs in a single RAID 200-1, the wear level of other RAIDs 200 in the disk array is taken into account. It is possible to effectively balance the data distribution of the PLB storing the data in the entire disk array by means of the ratio of the number of the unreserved PLBs in a single RAID 200-1 to the number of unreserved PLBs in the whole disk array.

In some embodiments, a mapper managing a mapping relationship will dynamically use the above Equation (1) to calculate the number of PLBs expected to store data in each RAID. In an alternative embodiment, a timer may be set to perform the calculation at a constant time interval, such a time interval may be set, for example, to one minute. In other embodiments, the above calculation may be performed in response to the addition of a new disk if the user updates the RAID. It is very necessary to update RAID in this case because the user often adds the new disk when the wear level of the existing disk is large and the wear levels of such a new disk and the existing disk are greatly different.

In some embodiments, the wear level of the disk 100 may be determined based on a ratio of the used time of the disk 100 to a rated lifetime of the disk 100. The used time indicates the duration that the disk 100 has been used to store data, and the rated lifetime indicates the maximum time that the disk 100 can be used to store data. As the disk is being used, the wear level will gradually increase. This will cause a change to the number of PLBs that are expected to store data. In this way, some RAIDs that are previously classified in the overrun ring will likely to be classified in the allocating ring. Thus, when an instruction to write data from the user is received, these RAIDs may be written into data again, thereby performing the dynamic writing of data in the disk array.

In some embodiments, if the number of used PLBs in RAID 200-1 in which data has been stored exceeds the number of PLBs that are expected to store data, no data will be written to the RAID 200-1. At the same time, the mapper that manages the mapping relationship will judge whether the number of used PLBs in other RAIDs in which data has been stored is smaller than the number of PLBs that are expected to store data. That is, the mapper will seek to find whether there exists another RAID that may be used to store the target data. If, for all RAIDs in the disk array, the number of PLBs that are expected to store data is smaller than the number of used PLBs that have stored data, i.e., if there is no other RAIDs available for storing the target data, this means all the PLBs on the RAID are occupied. In this case, the mapper will notify the user to add a new disk to the disk array to expand the capacity in order to update the RAID. In some embodiments, prior to the user inserts the new disk, the reserved PLB functioning to reserve on the RAID may be used to temporarily write the user's data. In some embodiments, if the disk 110-0-0 has a very high level of wear, i.e., an end-of-life (EOL) is fast approaching, by inserting a disk of the same type, dividing it into extents and notifying the mapper managing the mapping relationship to implement rebuilding, the rebuilding of the disk 110-0-0 may be completed.

In some embodiments, the reserved PLBs may be selected in a round-robin manner. In the event that these reserved PLBs are also occupied, the mapper will send a message that the capacity is in shortage and the user's write will be rejected. At this point, since the impact exerted by data reading on the wear level of the disk is small, the mapper will not actively move the user data from the RAID which has already been overloaded to the RAID newly inserted. In this case, if the user selects an overloaded RAID while writing data, all PLBs on this RAID will be moved to a new RAID.

As can be seen from the above description, according to the method of embodiment of the present disclosure, RAID may be created according to the wear levels of the disks in the disk array, the wear levels are utilized to obtain the number of PLBs expected to store data in the RAID, and the allocation of the stored data is optimized according to the number.

Figure 4:
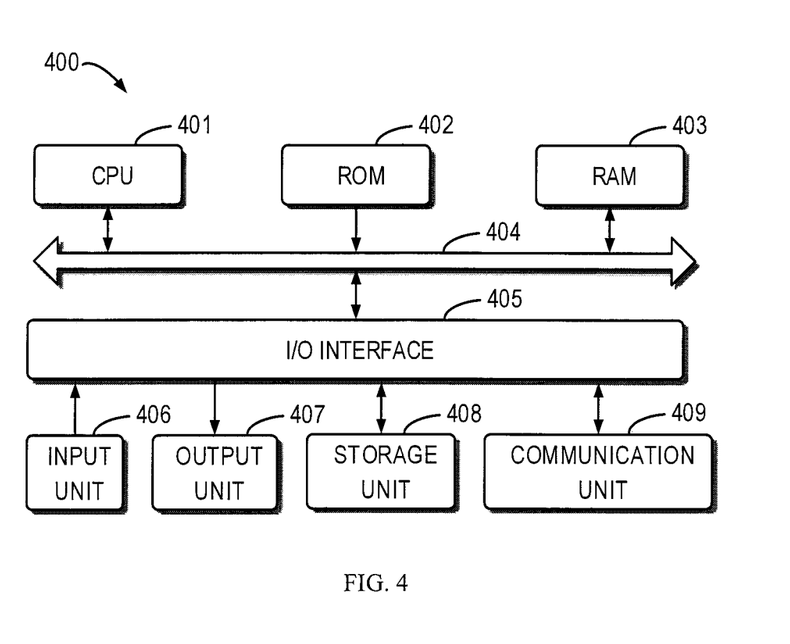
FIG. 4 illustrates a schematic block diagram of an example device that may be used to implement embodiments of the present disclosure.

FIG. 4 illustrates a schematic block diagram of an example device 400 that may be used to implement embodiments of the present disclosure. The device 400 may be used to implement the method 300 in FIG. 3.

As shown, the device 400 includes a Central Processing Unit (CPU) 401 which is capable of performing various processes in accordance with computer program instructions stored in a Read Only Memory (ROM) 402 or computer program instructions loaded from a storage unit 408 to a Random Access Memory (RAM) 403. Various programs and data as required by operation of the device 400 may also store in the RAM 403. The CPU 410, the ROM 402 and the RAM 403 are connected to one another via a bus 404. An Input/Output (I/O) interface 405 is also connected to the bus 404.

A plurality of components in the device 400 are connected to the I/O interface 405 including an input unit 406 such as a keyboard, a mouse, etc.; an output unit 407 such as various types of displays and speakers; a storage unit 408 such as a magnetic disk or optical disk; and a communication unit 409 such as a network card, a modem, a wireless communication transceiver etc. The communication unit 409 allows the device 400 to exchange information/data with other devices via a computer network such as the Internet and/or various telecommunication networks.

The processing unit 401 performs various method and processes described above, for example the process 300. For example, in some embodiments, the process 300 may be implemented as a computer software program or computer program product, which is tangibly contained in a machine-readable medium such as a non-transitory computer-readable medium, for example the storage unit 408. In some embodiments, the computer program may be partially or fully loaded and/or installed on the device 400 via ROM 402 and/or communication unit 409. When the computer program is loaded on the RAM 403 and executed by CPU 401, one or more steps of the process 300 described above may be executed. Alternatively, in other embodiments, the CPU 401 may be configured to perform the process 300 in any other suitable manner (e.g., by means of firmware).

It is to be understood by those skilled in the art that various steps of the above-described methods of the present disclosure may be implemented by a general-purpose computing device, and they may be centralized on a single computing device or distributed over a network of multiple computing devices. Alternatively, they may be implemented by a program code executable by the computing device so that they may be stored in the storage device and executed by the computing device, or they may be fabricated into individual integrated circuit modules, or multiple modules or steps therein are fabricated into a single integrated circuit module. Thus, the present disclosure is not limited to any specific combination of hardware and software.

It should be appreciated that although several means or sub-means of the device (e.g., specialized circuitry) are mentioned in the above detailed description; such division is merely by way of example and not mandatory. As a matter of fact, according to embodiments of the present disclosure, features and functions of two or more means described above may be embodied in one means. Rather, the feature and function of one means described above may be further divided and embodied by multiple means.

What are described above are only optional embodiments of the present disclosure, and are not intended to limit the present disclosure, and those skilled in the art appreciate that various changes and modifications may be made to the present disclosure. Any modifications, equivalent substitutions, improvements, etc., made within the spirit and scope of the present disclosure is intended to be included within the scope of the present disclosure.

We claim:

1. A method of managing a redundant array of independent disks (RAID), comprising:
   obtaining information on a wear level associated with each of a plurality of disks;
   selecting, based on the information on the wear level, a group of disks from the plurality of disks, a difference between wear levels of any two of the group of disks being below a predetermined threshold; and
   creating a RAID with extents from the selected group of disks;
wherein the RAID comprises a plurality of physical large blocks (PLBs),
   each PLB including a block in extents of each of the group of disks,
   the method further comprising:

in response to receiving a request to write target data to the RAID, determining, from the plurality of PLBs of the RAID, a first number of used PLBs having data stored therein;

determining, based on an average value of wear levels of the group of disks and from the plurality of PLBs of the RAID, a second number of PLBs expected to store data; and in response to the first number being below the second number, determining a third number of free PLBs available for storing the target data.

2. The method according to claim 1, further comprising:
determining the third number of free PLBs from the plurality of PLBs; and
storing the target data in the free PLBs.

3. The method according to claim 1, wherein determining the second number of PLBs expected to store data comprises:

determining, based on the average value of the wear levels of the group of disks, a first wear level of the RAID;

determining, based on the first wear level of the RAID, a fourth number of unreserved PLBs from the plurality of PLBs of the RAID;

determining, based on a second wear level of another RAID associated with the RAID, a fifth number of used PLBs and a sixth number of unreserved PLBs of the other RAID; and determining, based on the first number of used PLBs and the fourth number of unreserved PLBs of the RAID as well as the fifth number of used PLBs and the sixth number of unreserved PLBs of the other RAID, the second number of PLBs from the plurality of PLBs of the RAID.

4. The method according to claim 1, further comprising:
in response to the first number exceeding the second number, determining whether there is another RAID available for storing the target data; and
in response to absence of the other RAID, adding a new disk to the plurality of disks to update the RAID.

5. The method according to claim 1, wherein obtaining information on the wear level associated with each of the plurality of disks comprises:

obtaining used time of a disk, the used time indicating a duration that the disk has been used to store data;

obtaining a rated lifetime of the disk, the rated lifetime indicating the maximum time that the disk can be used to store data; and obtaining, based on the used time and the rated lifetime, the information on the wear level associated with the disk.

6. An electronic device for managing a redundant array of independent disks (RAID), comprising:
at least one processing unit;
at least one memory coupled to the at least one processing unit and storing instructions executed by the at least one processing unit, the instructions, when executed by the at least one processing unit, causing the device to perform acts, the acts comprising:
obtaining information on a wear level associated with each of a plurality of disks;
selecting, based on the information on the wear level, a group of disks from the plurality of disks, a difference between wear levels of any two of the group of disks being below a predetermined threshold; and
creating a RAID with extents from the selected group of disks;

wherein the RAID comprises a plurality of physical large blocks (PLBs),
each PLB including a block in extents of each of the group of disks,
the device further comprising:
in response to receiving a request to write target data to the RAID, determining, from the plurality of PLBs of the RAID, a first number of used PLBs having data stored therein;
determining, based on an average value of wear levels of the group of disks and from the plurality of PLBs of the RAID, a second number of PLBs expected to store data; and
in response to the first number being below the second number, determining a third number of free PLBs available for storing the target data.

7. The electronic device according to claim 6,
wherein the acts further comprise:
determining the third number of free PLBs from the plurality of PLBs; and
storing the target data in the free PLBs.

8. The electronic device according to claim 6,
wherein determining the second number of PLBs expected to store data comprises:
determining, based on the average value of the wear levels of the group of disks, a first wear level of the RAID;
determining, based on the first wear level of the RAID, a fourth number of unreserved PLBs from the plurality of PLBs of the RAID;
determining, based on a second wear level of another RAID associated with the RAID, a fifth number of used PLBs and a sixth number of unreserved PLBs of the other RAID; and
determining, based on the first number of used PLBs and the fourth number of unreserved PLBs of the RAID as well as the fifth number of used PLBs and the sixth number of unreserved PLBs of the other RAID, the second number of PLBs from the plurality of PLBs of the RAID.

9. The electronic device according to claim 6,
wherein the acts further comprise:
in response to the first number exceeding the second number, determining whether there is another RAID available for storing the target data; and
in response to absence of the other RAID, adding a new disk to the plurality of disks to update the RAID.

10. The electronic device according to claim 6, wherein obtaining information on the wear level associated with each of the plurality of disks comprises:
obtaining used time of a disk, the used time indicating a duration that the disk has been used to store data;
obtaining a rated lifetime of the disk, the rated lifetime indicating the maximum time that the disk can be used to store data; and
obtaining, based on the used time and the rated lifetime, the information on the wear level associated with the disk.

11. A computer program product having a non-transitory computer readable medium which stores a set of instructions to manage a redundant array of independent disks (RAID); the set of instructions, when carried out by computerized circuitry, causing the computerized circuitry to perform a method of:
obtaining information on a wear level associated with each of a plurality of disks;

selecting, based on the information on the wear level, a group of disks from the plurality of disks, a difference between wear levels of any two of the group of disks being below a predetermined threshold; and creating a RAID with extents from the selected group of disks;

wherein the RAID comprises a plurality of physical large blocks (PLBs), each PLB including a block in extents of each of the group of disks, the method further comprising:

in response to receiving a request to write target data to the RAID, determining, from the plurality of PLBs of the RAID, a first number of used PLBs having data stored therein;

determining, based on an average value of wear levels of the group of disks and from the plurality of PLBs of the RAID, a second number of PLBs expected to store data; and in response to the first number being below the second number, determining a third number of free PLBs available for storing the target data.

12. The computer program product according to claim 11, wherein the method further comprises:

determining the third number of free PLBs from the plurality of PLBs; and storing the target data in the free PLBs.

13. The computer program product according to claim 11, wherein determining the second number of PLBs expected to store data comprises:

determining, based on the average value of the wear levels of the group of disks, a first wear level of the RAID;

determining, based on the first wear level of the RAID, a fourth number of unreserved PLBs from the plurality of PLBs of the RAID;

determining, based on a second wear level of another RAID associated with the RAID, a fifth number of used PLBs and a sixth number of unreserved PLBs of the other RAID; and determining, based on the first number of used PLBs and the fourth number of unreserved PLBs of the RAID as well as the fifth number of used PLBs and the sixth number of unreserved PLBs of the other RAID, the second number of PLBs from the plurality of PLBs of the RAID.

14. The computer program product according to claim 11, wherein the method further comprises:

in response to the first number exceeding the second number, determining whether there is another RAID available for storing the target data; and in response to absence of the other RAID, adding a new disk to the plurality of disks to update the RAID.

15. The method according to claim 11, wherein obtaining information on the wear level associated with each of the plurality of disks comprises:

obtaining used time of a disk, the used time indicating a duration that the disk has been used to store data;

obtaining a rated lifetime of the disk, the rated lifetime indicating the maximum time that the disk can be used to store data; and obtaining, based on the used time and the rated lifetime, the information on the wear level associated with the disk.

* * * * *